United States Patent
Socarras et al.

(10) Patent No.: US 10,198,358 B2
(45) Date of Patent: Feb. 5, 2019

(54) SYSTEM AND METHOD OF TESTING PROCESSOR UNITS USING CACHE RESIDENT TESTING

(71) Applicants: Advanced Micro Devices, Inc., Sunnyvale, CA (US); ATI Technologies ULC, Markham (CA)

(72) Inventors: Angel E. Socarras, Lake Mary, FL (US); Kostantinos Danny Christidis, Toronto (CA); Curtis Alan Gilgan, Austin, TX (US); Alexander Fuad Ashkar, Orlando, FL (US)

(73) Assignees: ADVANCED MICRO DEVICES, INC., Sunnyvale, CA (US); ATI TECHNOLOGIES ULC, Markham, Ontario (CA)

( * ) Notice: Subject to any disclaimer, the term of this patent is extended or adjusted under 35 U.S.C. 154(b) by 164 days.

(21) Appl. No.: 14/243,050

(22) Filed: Apr. 2, 2014

(65) Prior Publication Data

US 2015/0286573 A1 Oct. 8, 2015

(51) Int. Cl.
*G06F 12/0875* (2016.01)
*G06F 11/22* (2006.01)
*G06F 11/30* (2006.01)
*G06F 11/273* (2006.01)

(52) U.S. Cl.
CPC ...... *G06F 12/0875* (2013.01); *G06F 11/2236* (2013.01); *G06F 11/2733* (2013.01); *G06F 11/3037* (2013.01); *G06F 2212/452* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 4,195,341 A | * | 3/1980 | Joyce | G06F 11/2284 711/118 |
| 5,317,711 A | * | 5/1994 | Bourekas | G06F 11/25 711/E12.02 |
| 5,809,320 A | * | 9/1998 | Jain | G06F 9/3857 712/34 |
| 6,101,578 A | * | 8/2000 | Patwardhan | G06F 9/3802 711/125 |

(Continued)

*Primary Examiner* — Jared I Rutz
*Assistant Examiner* — Stephanie Wu
(74) *Attorney, Agent, or Firm* — Volpe and Koenig, P.C.

(57) ABSTRACT

Apparatuses, computer readable mediums, and methods of processor unit testing using cache resident testing are disclosed. The method may include loading a test program in a cache on a chip comprising one or more processor units. The method may include the one or more processor units executing the test program to generate one or more results. The method may include redirecting a first memory reference to the cache, wherein the first memory reference is generated during the execution of the test program. The method may include determining whether the one or more generated results match one or more test results. The method may include redirecting a memory request to a memory location resident in the cache if the memory request includes a memory location not resident in the cache. The method may include redirecting a memory request to the cache if the memory request is not directed to the cache.

15 Claims, 4 Drawing Sheets

(56) References Cited

U.S. PATENT DOCUMENTS

| | | | | |
|---|---|---|---|---|
| 6,272,597 B1* | 8/2001 | Fu | G06F 12/0897 | 711/122 |
| 6,351,681 B1* | 2/2002 | Chih | G01R 31/318505 | 324/762.06 |
| 6,463,509 B1* | 10/2002 | Teoman | G06F 9/4401 | 711/113 |
| 6,760,816 B1* | 7/2004 | Ju | G06F 9/30043 | 711/133 |
| 7,665,002 B1* | 2/2010 | White | G01R 31/31705 | 714/727 |
| 7,856,530 B1* | 12/2010 | Mu | G06F 12/0888 | 711/119 |
| 8,612,797 B2* | 12/2013 | Thayer | G11C 29/76 | 714/6.1 |
| 2003/0126508 A1* | 7/2003 | Litt | G06F 11/25 | 714/39 |
| 2004/0064668 A1* | 4/2004 | Kjos | G06F 12/1027 | 711/202 |
| 2004/0153793 A1* | 8/2004 | Jarboe, Jr. | G11C 29/08 | 714/27 |
| 2004/0181634 A1* | 9/2004 | Taylor | G06F 12/0802 | 711/140 |
| 2004/0268045 A1* | 12/2004 | Gray | G06F 12/0802 | 711/118 |
| 2005/0240745 A1* | 10/2005 | Iyer | G06F 12/0223 | 711/167 |
| 2006/0149904 A1* | 7/2006 | Mowry | G06F 9/383 | 711/137 |
| 2007/0050491 A1* | 3/2007 | Kataoka | H04L 67/2814 | 709/223 |
| 2007/0174718 A1* | 7/2007 | Fouquet-Lapar | G11C 29/44 | 714/42 |
| 2008/0052467 A1* | 2/2008 | Thompson | G06F 12/0864 | 711/128 |
| 2008/0126911 A1* | 5/2008 | Brittain | G01R 31/31712 | 714/763 |
| 2008/0140934 A1* | 6/2008 | Luick | G06F 12/0897 | 711/117 |
| 2008/0184003 A1* | 7/2008 | Ono | G06F 12/0888 | 711/170 |
| 2008/0313442 A1* | 12/2008 | Wei | G06F 11/2236 | 712/227 |
| 2009/0157954 A1* | 6/2009 | Chung | G06F 12/0804 | 711/104 |
| 2009/0193305 A1* | 7/2009 | Liu | G01R 31/318555 | 714/727 |
| 2009/0216965 A1* | 8/2009 | Ohno | G06F 3/0613 | 711/154 |
| 2009/0307502 A1* | 12/2009 | GadelRab | B82Y 25/00 | 713/193 |
| 2010/0313092 A1* | 12/2010 | Xu | G06F 11/2236 | 714/738 |
| 2012/0260024 A1* | 10/2012 | Haywood | G06F 13/1642 | 711/103 |
| 2013/0031408 A1* | 1/2013 | Beck | G11C 29/08 | 714/27 |
| 2014/0052698 A1* | 2/2014 | Chen | G06F 9/45558 | 707/692 |
| 2015/0106545 A1* | 4/2015 | Godard | G06F 12/0893 | 711/3 |

* cited by examiner

SYSTEM AND METHOD OF TESTING PROCESSOR UNITS USING CACHE RESIDENT TESTING

TECHNICAL FIELD

The disclosed embodiments are generally directed to testing processor units, and in particular, to testing processor units using cache resident testing.

BACKGROUND

Electronic circuits may be manufactured out of a semiconductor material such as silicon. A wafer may be the product of the manufacture. After the manufacture of the wafer the wafer may be cut into chips, and the chips may be packaged with pins to connect the chip to other electronic circuits. The electronic circuits of the chips are often tested prior to being used. The electronic circuits are tested because sometimes the electronic circuits do not operate correctly due to manufacturing faults. Often, a portion of an electronic circuit of a chip may not operate correctly, but other portions of the electronic circuit of the chip may operate correctly and be sold and used. The electronic circuits may include processors such as central processing units, peripheral processing units, digital signal processors, application processors, graphical processing units, shaders, and the like.

Often, the electronic circuits are tested using functional tests where each of the possible functions of the electronic circuits are tested sequentially. Because the number of functions of the electronic circuit may be very large, often only a portion of the possible functions of the electronic circuit are tested. However, even testing a portion of the possible functions of the electronic circuit may be very time consuming and require the use of expensive testing equipment for many minutes. Additionally, when different parts of the electronic circuit can be disabled to try and find portions of the electronic circuit that can be used, the absence of the disabled units will alter the signaling at the electronic device inputs and outputs, increasing the number of custom functional tests required to verify every possible configuration of disabled units, and making it more difficult to perform functional testing.

Therefore, there is a need in the art for an apparatus, computer readable medium, and method of testing processors using cache resident testing.

SUMMARY OF EMBODIMENTS

Some disclosed embodiments provide a method of processor unit testing using cache resident testing. The method may include loading a test program in a cache on a chip comprising one or more processor units. The method may include the one or more processor units executing the test program to generate one or more results. The method may include redirecting a first memory reference to the cache, wherein the first memory reference is generated during the execution of the test program. In some embodiments, all memory references are redirected to the cache. And, the method may include determining whether the one or more generated results matches one or more test results.

In some disclosed embodiments, redirecting may include redirecting the first memory request to a first memory location resident in the cache on a condition that the first memory request comprises a second memory location not resident in the cache. In some disclosed embodiments, redirecting may include redirecting the first memory request to the cache on a condition that the first memory request is not directed to the cache. In some disclosed embodiments, the method may include redirecting a second memory request from a write back of the one or more processing units to the cache.

A system for processor unit testing using cache resident testing is disclosed. The system may include a cache configured to store a test program. The system may include one or more processing units configured to execute the test program and generate results indicative of whether the test program was executed correctly. The system may also include an electronic circuit configured to redirect a first memory request to an external memory to the cache.

In some disclosed embodiments, the cache may be further configured to load the test program from outside a chip of the cache. In some disclosed embodiments, the electronic circuit may be further configured to redirect the first memory request to a first memory location resident in the cache on a condition that the first memory request comprises a second memory location not resident in the cache. In some disclosed embodiments, the electronic circuit may be further configured to redirect the first memory request to the cache on a condition that the first memory request is not directed to the cache. In some disclosed embodiments, the electronic circuit is further configured to redirect a second memory request from a write back of the one or more processing units to the cache.

Some embodiments provide a computer readable non-transitory medium including instructions which when executed in a processing system cause the processing system to execute a method of processor unit testing using cache resident testing as disclosed herein.

BRIEF DESCRIPTION OF THE DRAWINGS

A more detailed understanding may be had from the following description, given by way of example in conjunction with the accompanying drawings wherein.

DETAILED DESCRIPTION OF EMBODIMENT(S)

Figure 1:
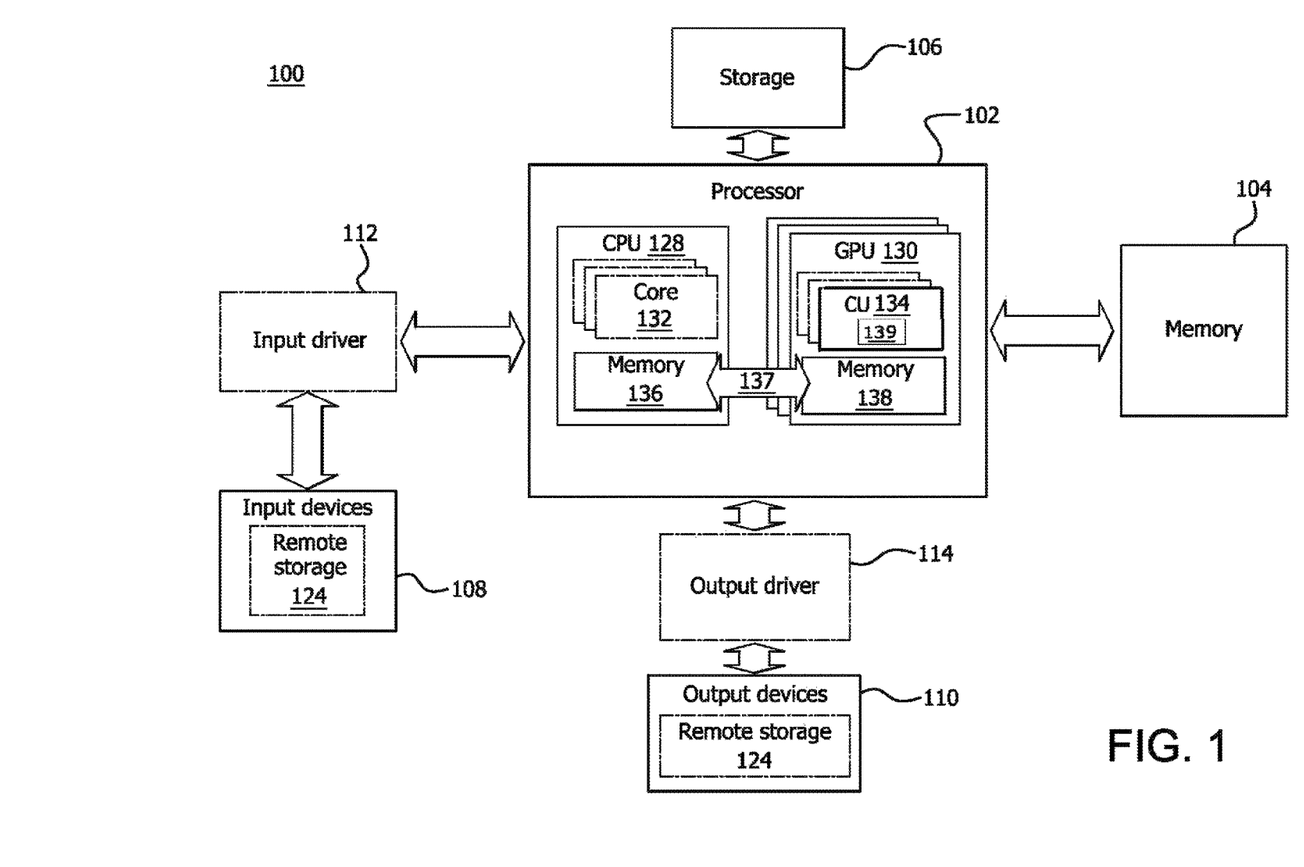
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include processing units of different types—e.g., one or more central processing units (CPU) 128, which may include one or more cores 132 (i.e., a first processor type), and one or more graphics processing unit (GPU) 130, which may include one or more compute units (CU) 134 or GPU cores (i.e., a second processor type). As known to those of ordinary skill in the art, processors of types different to the CPU and GPU are known. These other processors include, for example, digital signal processors, application processors and the like. The CPU 128 and GPU 130 may be located on the same die, or multiple dies. The CUs 134 may be organized into groups with a processing control (not illustrated) controlling a group of CUs 134. A processing control may control a group of CUs 134 such that the group of CUs 134 perform as a single instruction multiple data (SIMD) processing units (not illustrated). The CU 134 may include a memory 139 that may be shared with one or more other CUs 134. For example, a processing control may control 32 CUs 134, and the 32 CUs 134 may all share the same memory 139 with the processing control.

The GPU 130 and the CPU 128 may be other types of computational elements. The CPU 128 may include memory 136 that is shared among cores of the CPU 128. In some disclosed embodiments, the memory 136 is an L2 cache. The GPU 130 may include memory 138 that is shared among the CUs 134 of one or more GPUs 130. Data may be transferred via 137 between the memory 136 and memory 138 and memory 139. The GPU 130 and CPU 128 may include other memories such as memory for each core 132 and memory for each of the processing units of the CU 134 that is not illustrated. The memories 136, 138, and 139 may be part of a cache system (not illustrated), or may not be coherent memory. The memory 104 may be located on the same die as the processor 102, or may be located separately from the processor 102. The memory 104 may include a volatile or non-volatile memory, for example, random access memory (RAM), dynamic RAM (DRAM), or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
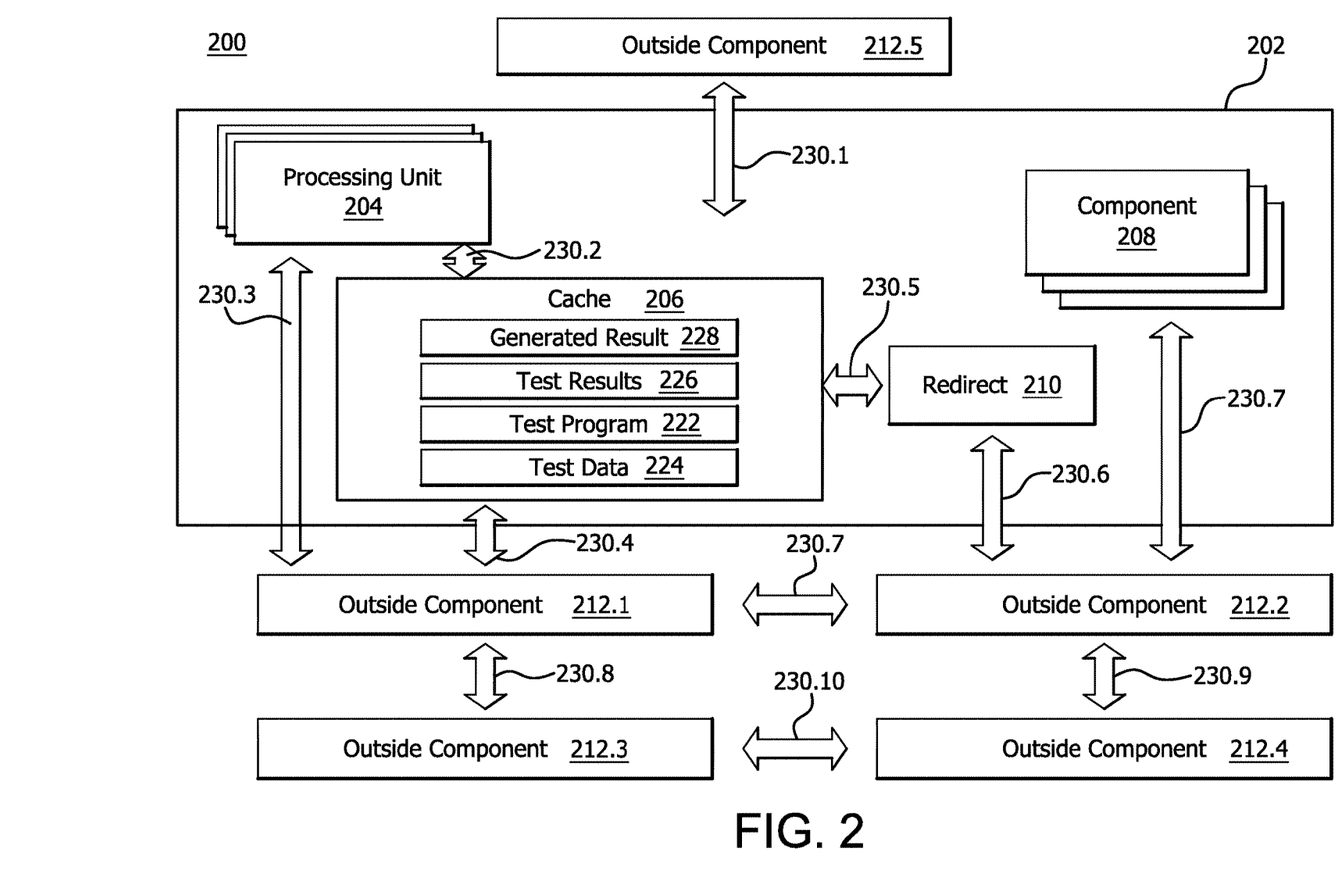
FIG. 2 schematically illustrates a system for testing using cache resident testing according to some disclosed embodiments.

FIG. 2 schematically illustrates a system 200 for testing using cache resident testing according to some disclosed embodiments. Illustrated in FIG. 2 is a chip 202, outside components 212, and connections 230. The processors 204 execute a test program that is loaded in the cache 206, and the redirect 210 redirects memory access that are not to the cache 206 to the cache 206.

The chip 202 may include one or more processing units 204, one or more caches 206, one or more components 208, redirect 210, and connections 230. The processing units 204 may be central processing units, peripheral processing units, digital signal processors, application processors, graphical processing units, shaders, and the like. The chip 202 may have pins (not illustrated) to connect to the outside components 212.

The one or more caches 206 may include a test program 222, test data 224, test results 226, and generated result 228. The cache 206 may be a level one (L1), level two (L2), or level three (L3), that caches memory from another memory outside the chip 202. In some embodiments, the chip 202 may have multiple caches 206 that may include levels of cache 206. Additionally, one or more of the processing unit 204 and component 208 may include a cache 206. The caches 206 may be in communication 230 with the processing unit 204, outside components 212, redirect 210, components 206, and other electronic circuits that may not be illustrated in FIG. 2. In some embodiments, the one or more caches 206 may be linearly mapped L2 caches.

The test program 222 may be a program that tests the chip 202 and is executed by at least one processing unit 204. For example, the processing unit 204 may be a shader of a graphic processing unit. The shader may execute the test program 222 by performing graphical processing on the test data 224 stored in the cache 206. The shader may generate a generated result 228. The generated result 228 may be a check sum of the test data 224 after the performance of the graphical processing. The test program 222 may compare the generated result 228 with the test results 226. The test results 226 may be expected test results 226. The test results 226 may be a pre-determined check sum for what the test data 224 should be after graphical processing. The test data 224 may be data to be operated on by the test program 222. The test program 222 may be written so that it does not cause cache evictions. The test program 222 may be written so that it uses a limited range of memory so that the memory accesses remain resident in the cache 206. In some embodiments, the test program 222 may execute within a region of the cache 206 so that it not cause write evictions or read misses. In some embodiments, the one or more processing units 204 may be a control program of a graphics processing unit. The control program may execute the test program 222.

In some embodiments, the test program 222 may generate generated results 228 that indicate whether one or more components 208, the cache 206, the redirect 210, and/or another electronic circuit (not illustrated) on the chip 202 have executed the test program 222 correctly. For example, there may be one or more components 208 that perform similar functions. The test program 222 may selectively use the one or more components 208 to generate generated results 228 that indicate whether each of the one or more components 208 performed the functions correctly.

In some embodiments, the test program 222 may be thread groups that iterate through each processing unit 204. In some embodiments, the test program 222 may use other memories (not illustrated) on the chip 202. For example, the processing units 204 may include registers or caches that may be used by the test program 222.

In some embodiments, the test program 222 may selectively disable components. For example, the test program 222 may disable all but one processing unit 204 and run tests on the one processing unit 204 not disabled.

The test results 226 may be the results of the test program 222 operating on the test data 224. The generated result 228 may be a result that is generated from the test program 222 being executed by the processing unit 204.

The components 208 may be components on the chip 202. The components 208 may be tested by test program 222. The components 208 may generate memory reads and memory writes. The components 208 may be controlled by the processing units 204 or by outside components 212. The components 208 may be in communication with the processing units 204, the cache 206, redirect 210, and with other electronic circuits that are not illustrated.

The redirect 210 may redirect memory reads or writes from a processing unit 204, component 208, outside component 212, or another electronic circuit not illustrated. The redirect 210 may redirect a memory read or memory write from a communications bus to the cache 206. For example, outside component 212.2 may be a communications bus that sends memory read and/or memory write requests from components 208 to a memory. The redirect 210 may redirect the memory read and/or memory write to the cache 206. The cache 206 may not be a cache 206 that the component 208 accesses normally but the redirect 210 redirects the memory requests to the cache 206. In some embodiments, the redirect 210 may redirect a memory read and/or memory write request from the cache 206 back to the cache 206 to a different memory location that is resident in the cache 206. In some embodiments, the redirect 210 may redirect a memory read and/or memory write to an outside component 212. In some embodiments the redirect 210 may change a memory read and/or memory write to a different form that may include a different address specified in the memory read and/or write.

The redirect 210 may be an electronic circuit. The redirect 210 is illustrated as a single block, but the redirect 210 may be more than one block that may communicate with one another. For example, a portion of the redirect 210 may be part of the cache 206 and a portion of the redirect may be in communication with the outside component 212 or the component 208. A portion of the redirect 210 may be the processing unit 204, the component 208, the cache 206, an outside component 212, or another component of the chip 202 not illustrated.

The redirect 210 may only be active for testing. The redirect 210 may have an inactive mode for normal operation of the chip 202 where the redirect 210 does not affect the operation of the chip 202. In some embodiments, the redirect 210 may be physically disabled prior to normal operation of the chip 202. In some embodiments the testing may be performed "in the field" to determine if chip 202 continues to be capable of normal operation. Such "in the field" testing may or may not employ redirect 210. That is the testing performed may be performed while chip 202 is installed in a larger and operational system.

The outside components 212 may be electronic circuits that are in communication with the chip 202. The outside components 212 may be in communication with the chip 202 via pins of the chip 202. The outside components 212 may be special purpose outside components 212 that aid in the testing of the chip 202. The outside components 212 may be communication buses, processing units 204, caches 206, memory controllers, physical memory, or other electronic circuits. Some outside components 212 may be in communication with other outside components 212 and not the chip 202. For example, outside component 212.1 may be a memory controller and outside component 212.3 may be physical memory. In some embodiments, the outside component 212 may be a component that provides direct memory access to the cache 206 for loading the cache 206.

Connections 230 indicate communication connections 230 between the chip 202 and outside components 212 and between different components on the chip 202. The connections 230 may include control and data lines. The connection 230 between an inside component (for example the one or more processing units 204, cache 206, redirect 210, component 208) and an outside component may pass via pins in the chip 202. In some embodiments, the chip 202 may communicate with outside components 212 differently. For example, with radio waves or light waves. For example, connection 230.1 may be a direct memory bus between an outside processor and the cache 206. In some embodiments, connection 230.2 may be an electronic connection 230.2 between the one or more processing units 204 and the cache 206. In some embodiments, the connection 230.3 may be a communication between an outside component 212.1 and the one or more processing units 204. For example, the outside component 212.1 may be a memory controller and connection 230.3 may be a direct link to the memory that does not go through the cache 206. In some embodiments, the communication 230.4 may be communication between an outside component 212.1 and the cache 206. For example, connection 230.4 may be a link between the cache 206 and a memory controller. In some embodiments, the connection 230.5 may be between the cache 206 and the redirect 210. For example, the redirect 210 may have connections to the registers of the cache 206 for accessing memory locations. The connections 230.6 may connect the redirect 210 to an outside component 212.2. For example, the outside component 212.2 may be a communication bus that may include memory access traffic. The connections 230.6 may include lines that indicate when a memory access is on the bus and may include control lines to divert the memory access to the redirect 210 or the cache 206.

In some embodiments, the connection 230.7 connects the one or more components 208 to an outside component 212.2. For example, outside component 212.2 may be a memory controller or communications bus that the outside components 212.2 send memory access requests and receive memory responses of memory locations.

Although not illustrated, it is understood that other connections 230 between the outside components 212 and the chip 202 may be present. Additionally, it is understood that other connections between or among the one or more processing units 204, the one or more caches 206, the redirect 210, the one or more components, and other components (not illustrated) may be present.

In operation, the test program 222 is loaded into the cache 206 using an outside component 212. The test program 222 then is executed by one or more of the processing units 204. The test program 222 may generate the generated result 228. The generated result 228 may be used to determine whether or not a processing unit 204 operated correctly for the test program 222. The test program 222 may test one or more of the processing units 204. In some embodiments, the test results 226 may indicate that one or more of the processing units 204 are faulty. In some embodiments, the test results 226 may indicate that one or more the processing units 204 are not faulty.

Figure 3:
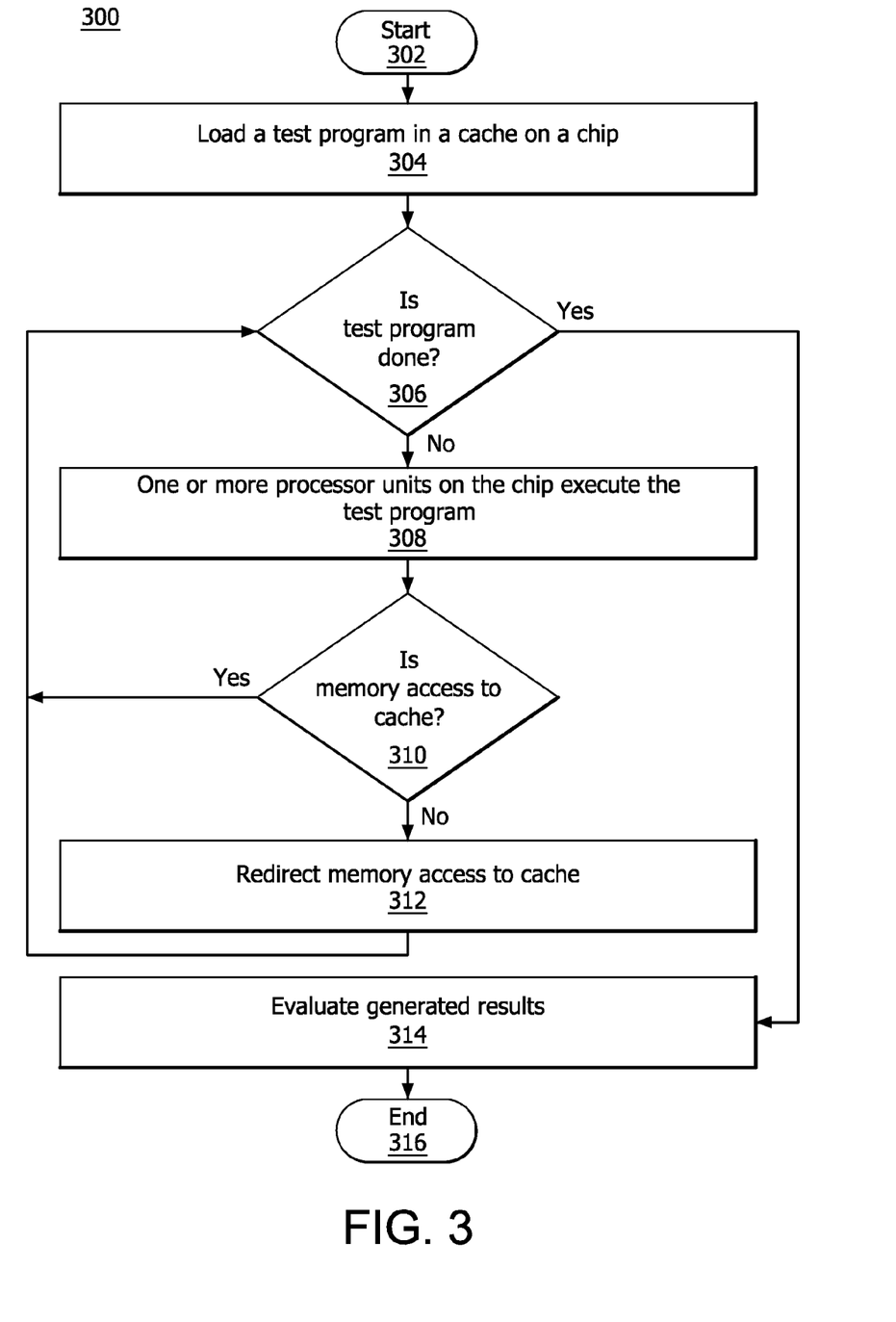
FIG. 3 schematically illustrates a method of processor unit testing using cache resident testing, according to some disclosed embodiments.

FIG. 3 schematically illustrates a method 300 of processor unit testing using cache resident testing, according to some disclosed embodiments. The method 300 may begin with start 302. The method 300 may continue with loading a test program in a cache on a chip 304. For example, referring to FIG. 2, the test program 222 may be loaded into the cache 206 using outside component 212.1, which may be a high speed bus which loads the test program 222 from the outside component 212.3. In some embodiments, test data 224 and test results 226 may be loaded in the cache 206. Alternatively, in some embodiments, the test program 222, test data 224, and test results 226, could also be stored on a chip on non-volatile storage and loaded directly into cache 206 without an external component.

The method 300 may continue with determining whether the test program is done 306. If the test program is not done then the method 300 continues with one or more processing units on the chip executing the test program 308. For example, referring to FIG. 3, the test program 222 may continue to be executed by one or more of the processing units 204.

The method 300 may continue with determining whether a memory access is to the cache 310. For example, continuing to refer to FIG. 2, the redirect 210 may determine that a memory access from a component 208 is not to the cache 206 but is on the outside component 212.2, which may be a communication bus. In another example, the redirect 210 may determine that a memory access from a processing unit 204 is to a memory location not in the cache 206. In another example, the redirect 210 may determine that a memory access is to the cache 206. For example, the redirect 210 may determine that a memory access to the cache 206 is resident in the cache 206. If the memory access is to the cache the method may return back to 306.

If the memory access is not to the cache, the method 300 may continue with redirecting the memory access to the cache 312. For example, continuing with the examples above, the redirect 210 may redirect the memory access to a memory location that is in the cache 206. In another example, the redirect 210 may redirect the memory access to the cache 206 from an access request to a different memory. In some embodiments, a memory access may not be to the cache, but may be to an outside component that is part of the testing. In this case, the memory access may not be redirected to the cache. The method 300 may return to 306.

The method 300 may return to determining whether the test program is done 306. The test program may be done. For example, continuing to refer to FIG. 2, the test program 222 may have generated the generated results 228.

The method 300 may continue with evaluating the results of the test program 314. For example, the test program 222 may determine whether the one or more generated results 228 matches one or more test results 314. For example, continuing to refer to FIG. 2, the test program 222 may compare the generated results 228 with the test results 226 to determine which of the processing units 204 computed the correct generated result 228. For example, the processing units 204 may be shaders and the test program 222 may have executed graphical processing on a graphical image. A check sum may be computed for the processed graphical image which may be the generated result 228. The test result 226 may be a check sum that is predetermined and loaded into the cache 206 and used to determine whether or not the processing unit 204 has a fault, or whether the processing unit 204 executed the testing program 222 correctly. In one example, there may be 5 shaders and the chip 202 may be sold at different prices depending on the number of shaders that function properly. So, the test program 222 may determine that 2 of the 5 shaders generated the correct check sum. The chip 202 may then be sold at a lower cost, with the 3 shaders that did not generate the correct processed graphical image being disabled.

In some embodiments, the generated results 228 may be read out of the chip 202 and then determined whether the one or more generated results matches one or more test results.

The method 300 may continue with end 316. In some embodiments, the method 300 may include reconfiguring the chip based on the determination of whether the one or more generated results match one or more test results. Additionally, in come embodiments, method 300 may include running functional testing on the reconfigured chip.

Figure 4:
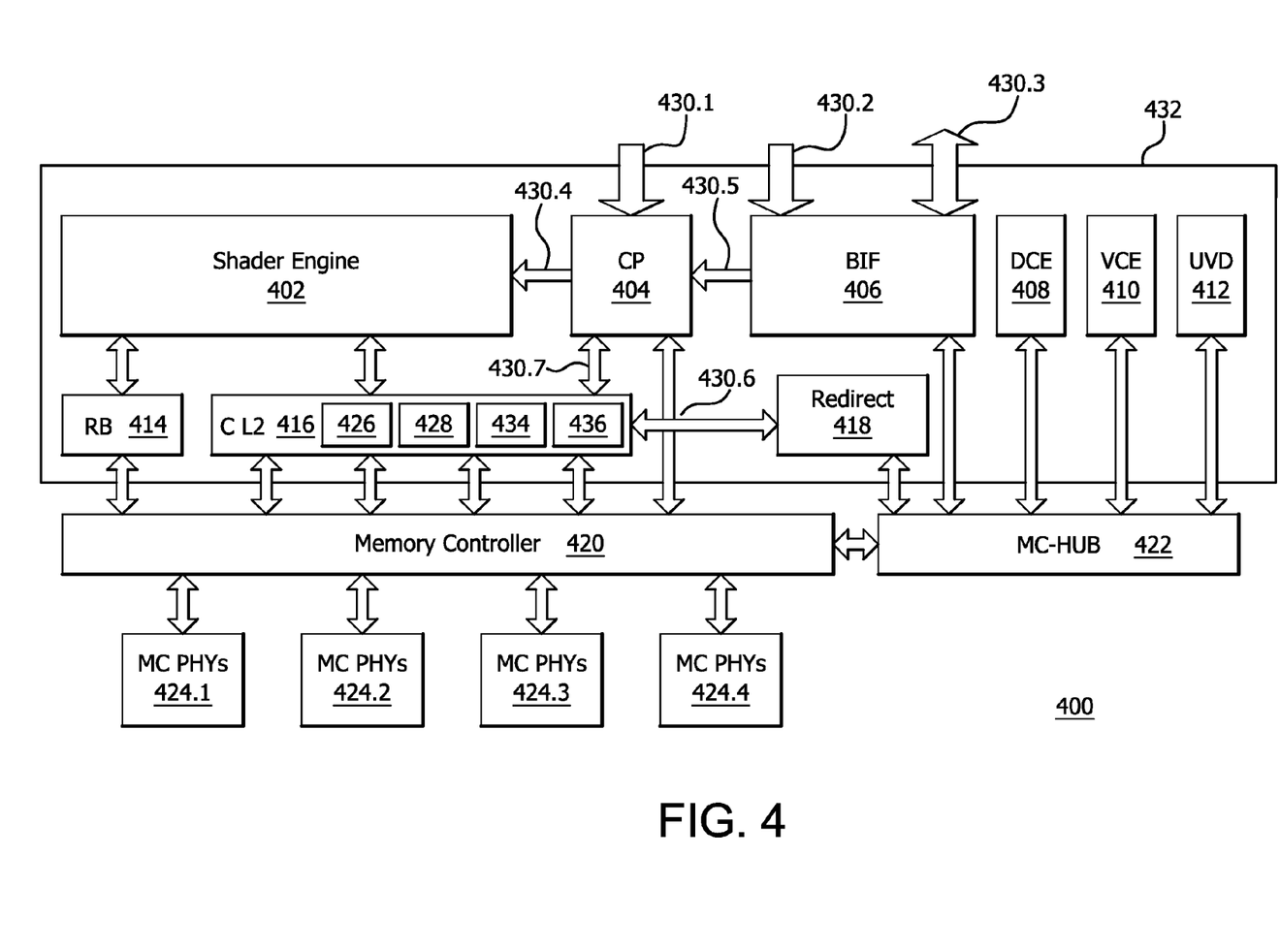
FIG. 4 schematically illustrates a system for testing using cache resident testing according to some disclosed embodiments.

FIG. 4 schematically illustrates a system 400 for testing using cache resident testing according to some disclosed embodiments. The system 400 includes chip 432, connections 430, memory controller 420, MC-HUB 422, and MC PHYS 424. For example, referring back to FIG. 1, the chip 432 map be the processor 102 without the CPU 128. The shader engine 402 may be the CU 134. And, the C L2 416 may be the memory 138.

The chip 432 may be a GPU. The chip 432 may include shader engine 402, CP 404, BIF 406, DCE 408, VCE 410, UVD 412, RB 414, TC L2 416, and redirect 418. The shader engine 402 may be one or more shader engines 402.

The BIF 406 may be memory controller. The Display Controller Engine (DCE) 408 may be a driver for a monitor. The VCE 410 may be a video compression engine (VCE) 410. The UVD 412 may be a universal video decoder (UVD) 412. For example, the UVD 412 may decode Blueray® coded video. The Render Back end (RB) 414 may be a write back (RB) 414 for the shader engine 402. The C L2 416 may be a cache.

The cache of level two (C L2) 416 may include test data 426, test program 428, test results 434, and generated result 436. The redirect 418 may be configured to redirect memory requests to the C L2 416. In some embodiments, the redirect 418 may be configured to redirect memory requests from the CP 404, shader engine 402, and/or the C L2 416.

In some embodiments, the redirect 418 may be configured to redirect memory requests from one or more of the DCE 408, VCE 410, UVD 412 and other components (not illustrated) that are placed on the MC-HUB 422 to the C L2 416. In some embodiments, the redirect 418 may redirect memory requests from one or more of the DCE 408, VCE 410, UVD 412, and other components by communicating with the MC-HUB 422 and/or the memory controller 420. In some embodiments, the redirect 418 may redirect memory requests from one or more of the DCE 408, VCE 410, UVD 412, and other components by an electronic circuit (not illustrated) between one or more of the DCE 408, VCE 410, UVD 412, and other components and the C L2 416.

In some embodiments, the redirect 418 may be configured to redirect memory requests from the RB 414 to the C L2 416. In some embodiments, the redirect 418 redirects memory requests from the RB 414 by communicating with the memory controller 420 and/or MC-HUB 422. In some embodiments, the redirect 418 may redirect the memory requests from the RB 414 by an electronic circuit (not illustrated) that connects the RB 414 with the C L2 416.

Connection 430.1 may be configured to load the C L2 416 with the test data 426, test program 428, test results 434, and generated result 436 via the CP 404 and connection 430.7.

The CP 404 may be a control processor (CP) 404 for the chip 432. The CP 404 may be configured to execute the test program 428 to generate generated result 436. The CP 404 may be configured to selectively turn off shader engine 402 in the case of more than one shader engine 402 and test each shader engine 402 separately or in different combinations. For example, the CP 404 may disable one or more shader engines 402 and run the test program 222 on the remaining shader engines 402, which may be three in some embodiments.

The CP 404 may be configured to selectively turn off one or more of the DCE 408, VCE 410, UVD 412, and other components, and generate results indicating whether turning off one or more of the DCE 408, VCE 410, UVD 412, and other components resulted in the test program 426 being executed correctly. The CP 404 may be configured to perform similar functions as described in reference to FIG. 2 for the processing units 204.

The memory controller 420 may be configured to resolve memory requests. The MC-HUB 422 may be a memory controller hub (MC-HUB) 422 and may be configured to resolve memory requests. In some embodiments, the MC-HUB 422 resolves memory requests in conjunction with the memory controller 420.

The MC PHYS 424 may be physical interface logic to memory that is accessed by the memory controller 420. In some embodiments, the outside components memory controller 420, MC-HUB 422, and MC PHYs 424 may not be present or used for the testing. In some embodiments, the outside components memory controller 420, MC-HUB 422, and MC PHYs 424 may be special purpose components configured to assist in testing. For example, the memory controller 420 and/or the MC-HUB 422 may redirect memory access requests as described in conjunction with the redirect 210 and redirect 418 for accesses that are communicated outside the chip 432.

Some disclosed embodiments have the advantage that functional testing does not need to be performed to identify components of a chip that have faults.

The methods provided may be implemented in a general purpose computer, a processor, or a processor core. Suitable processors include, by way of example, a general purpose processor, a graphics processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An integrated circuit (IC) for processor unit testing using cache resident testing, the integrated circuit comprising:
    a plurality of portions of memory, including a cache configured to store a test program including a plurality of different types of instructions configured to cause one or more components of the IC to implement one or more functions by executing a plurality of memory access requests to access the plurality of portions of memory;
    one or more processing units configured to execute the test program and generate one or more results indicative of whether the test program executes correctly; and
    an electronic circuit configured to, in response to a determination that one of the plurality of memory access requests is a request to access a memory location not resident in the cache:
        redirect said one memory access request to the cache, by redirecting the one memory access request from the memory location not resident in the cache to a memory location that is resident in the cache on a condition that said one memory access request is a request to access one of the plurality of portions of memory of the IC different from the cache; and
        not redirect said one memory access request to the cache on a condition that said one memory access request is a request to access an outside component, in communication with the IC and remote from the IC, being used to implement the test program.

2. The IC of claim 1, wherein the cache is further configured to receive the test program remote from the IC.

3. The IC of claim 1, wherein, if said one memory access request is redirected to the cache, the electronic circuit is further configured to redirect said one memory request from a write back of the one or more processing units to the cache.

4. The IC of claim 1, further comprising:
    other IC components configured to perform functions used by the one or more processing units in executing the test program;
    wherein the electric circuit is further configured to redirect said one memory request from the other IC components to the cache.

5. The IC of claim 1, wherein the cache is a linear cache and wherein the testing program is configured to not cause cache evictions.

6. The IC of claim 1, wherein, if said one memory access request is redirected to the cache, the electronic circuit is further configured to redirect said one memory request directed to a memory controller outside the IC to the cache.

7. The IC of claim 1, wherein the electronic circuit is further configured to change a first memory address of the one memory access request to a second memory address, wherein the second memory address is resident in the cache and the first memory address is not resident in the cache.

8. The IC of claim 1, wherein the one or more processor units are configured to selectively disable one or more of the one or more processor units and execute the test program to generate a second result that indicates whether the test program executed correctly with the one or more of the one or more processing units being disabled.

9. The IC of claim 1, wherein the electronic circuit comprises two modes a testing mode for testing and an operating mode, wherein in the operating mode the electronic circuit is disabled.

10. A method of processor unit testing using cache resident testing, the method comprising:
    receiving a test program in a cache on an integrated circuit (IC) comprising one or more processor units and a plurality of portions of memory including the cache, the test program including a plurality of different types of instructions configured to cause one or more components of the IC to implement one or more functions by executing a plurality of memory access requests to access the plurality of portions of memory;
    executing, by the one or more processor units, the test program to generate one or more results indicative of whether the test program executes correctly;

in response to a determination that one of the plurality of memory access requests is a request to access a memory location not resident in the cache:
   redirecting, to the cache, said one memory access request, by redirecting the one memory access request from the memory location not resident in the cache to a memory location that is resident in the cache, on a condition that said one memory access request is a request to access one of the plurality of portions of memory of the IC different from the cache; and
   not redirecting said one memory access request to the cache on a condition that said one memory access request is a request to access an outside component, in communication with the IC and remote from the IC, being used to implement the test program; and
determining whether the one or more generated results matches one or more test results.

11. The method of claim 10, further comprising:
if the one memory access request is directed to the cache, redirecting the one memory request from a write back of the one or more processing units to the cache.

12. The method of claim 10, further comprising:
monitoring a memory controller outside of the IC, and on a condition that the memory controller has a second memory access request, redirecting the second memory access request to the cache.

13. The method of claim 10, further comprising:
the one or more processor units selectively disabling one or more of the one or more processor units and executing the test program to generate a second result that indicates whether the test program executed correctly with the one or more of the one or more processing units being disabled.

14. The method of claim 10, wherein redirecting further comprises:
changing a first memory address of the one memory request to a second memory address, wherein the second memory address is resident in the cache and the first memory address is not resident in the cache.

15. A non-transitory computer readable medium including instructions for causing a computer to implement a method of processor unit testing using cache resident testing, the method comprising:
receiving a test program in a cache on an integrated circuit (IC) comprising one or more processor units and a plurality of portions of memory including the cache, the test program including a plurality of different types of instructions configured to cause one or more components of the IC to implement one or more functions by executing a plurality of memory access requests to access the plurality of portions of memory;
executing, by the one or more processor units, the test program to generate one or more results indicative of whether the test program executes correctly;
in response to a determination that one memory access request of the plurality of memory access requests a request to access a memory location not resident in the cache:
   redirecting, to the cache, the one memory access request of the plurality of memory access requests, by redirecting the one memory access request from the memory location not resident in the cache to a memory location that is resident in the cache, on a condition that the one memory access request is a request to access one of the plurality of portions of memory of the IC different from the cache; and
   not redirecting the one memory access request to the cache on a condition that the one memory access request is a request to access an outside component, in communication with the IC and remote from the IC, being used to implement the test program; and
determining whether the one or more generated results matches one or more test results.

\* \* \* \* \*